July 23, 1940.  D. J. COURTNEY  2,208,788
SEPARATING MACHINE
Filed July 11, 1939  2 Sheets-Sheet 2
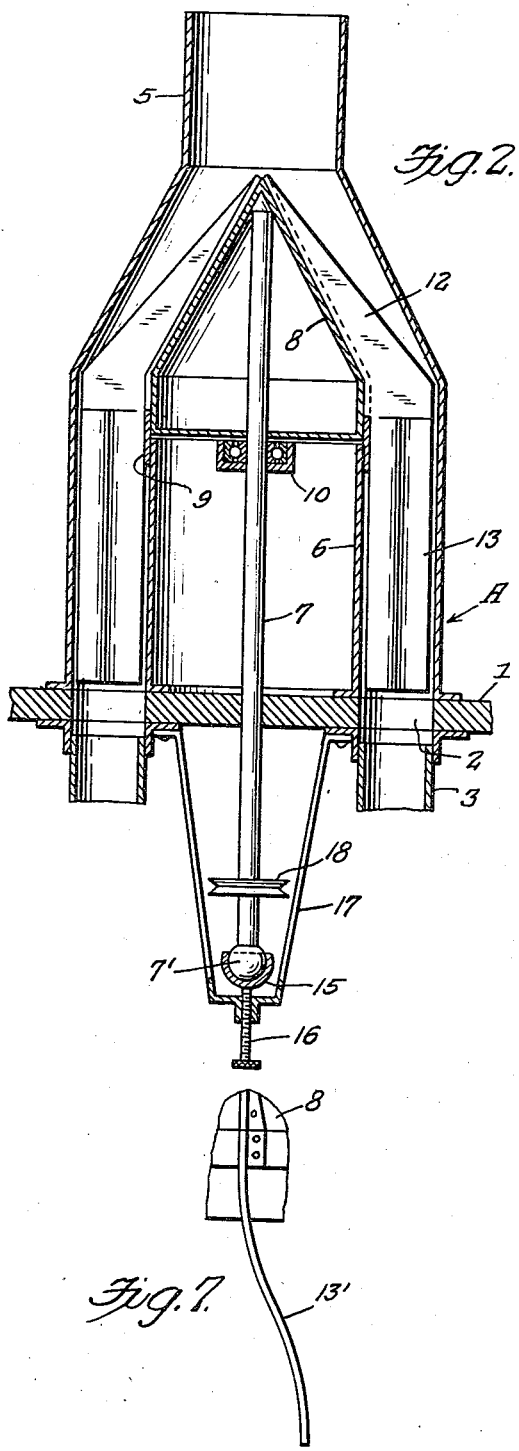
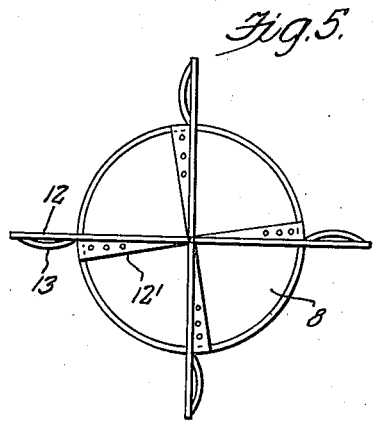
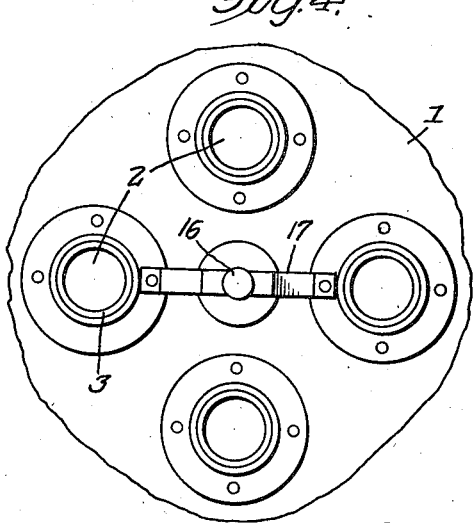
Inventor
*Daniel J. Courtney,*
By *Clarence A. O'Brien and Hyman Berman*
Attorneys Patented July 23, 1940

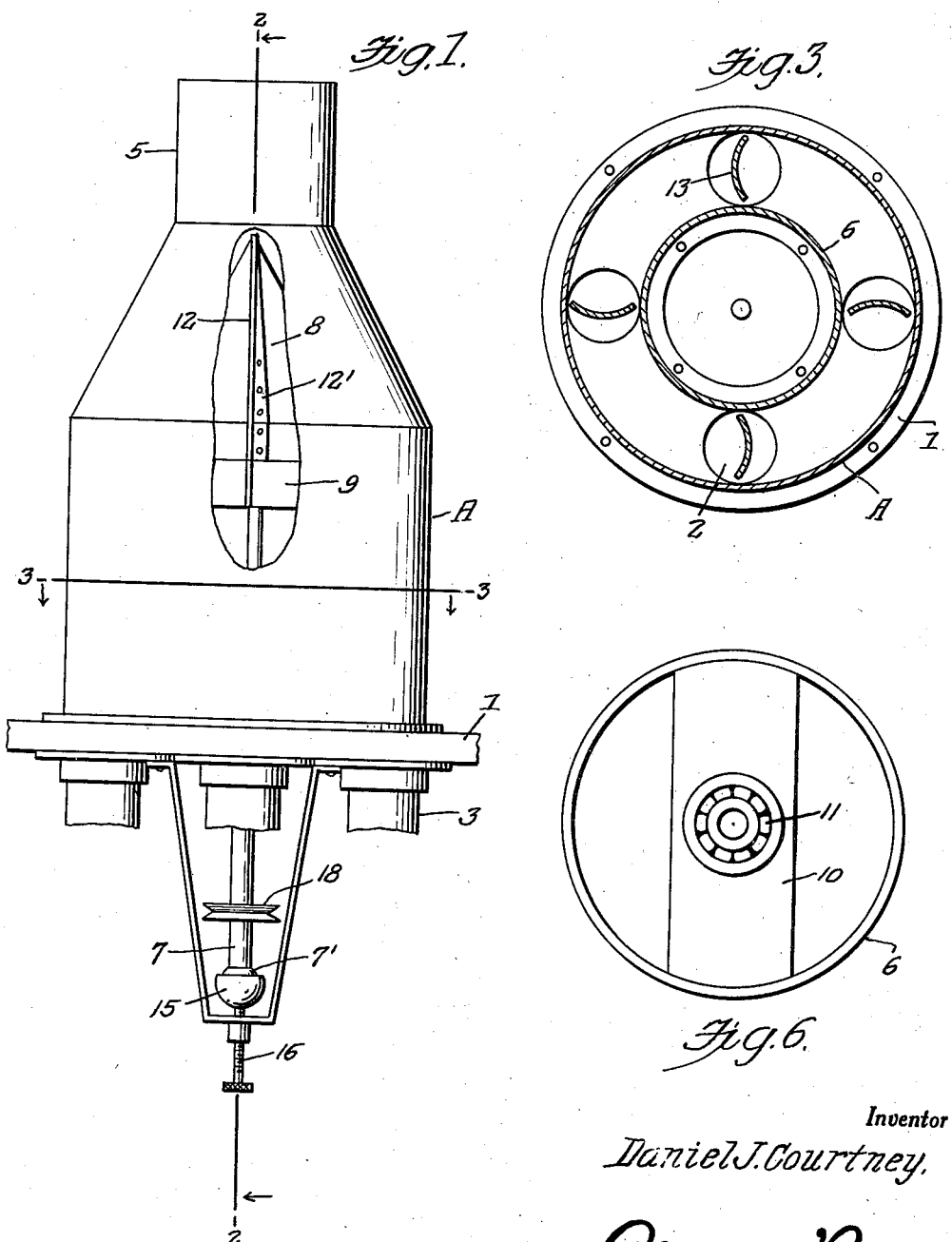

2,208,788

UNITED STATES PATENT OFFICE 2,208,788

SEPARATING MACHINE

Daniel J. Courtney, Janesville, Wis.

Application July 11, 1939, Serial No. 283,900

3 Claims. (Cl. 302—28)

This invention relates to a separating machine, the general object of the invention being to provide means for causing material placed therein in bulk form to be evenly distributed into discharge conduits which carry the material to any desired points.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevation of the apparatus with parts broken away to show the interior construction.

Figure 2 is a vertical sectional view taken on the line 2—2 of Figure 1.

Figure 3 is a section on the line 3—3 of Figure 1.

Figure 4 is a fragmentary bottom plan view of the invention.

Figure 5 is a top plan view of the conical member with its blades.

Figure 6 is a top plan view of the stationary cylinder.

Figure 7 is a fragmentary view showing a modified form of vertical blade.

In these views the numeral 1 indicates a base or platform having a plurality of holes 2 therein from which leads the discharge conduit 3. A housing A is fastened to the member 1 at the lower end of the housing and said housing surrounds the holes 2. The lower part of the housing is of cylindrical shape in cross section and its upper portion is of frusto-conical shape while the upper end of the housing is of reduced cylindrical shape to provide an inlet 5 for the material to be treated by the apparatus. A small stationary cylinder 6 is located in the lower part of the housing and is suitably fastened to the member 1 at the lower end of said cylinder 6 and said cylinder is placed inwardly of the group of holes 2 and forms with the cylindrical part of the housing an annular space with which the holes communicate at the bottom of said space. The upper end of the cylinder 6 is slightly below the upper end of the cylindrical part of the housing and a shaft 7 passes through the member 1 and through the top of the cylinder 6 and extends into the space formed by the conical part of the housing, the upper end of the shaft being connected to the top of a conical member 8. A ring 9 depends from the lower end of the conical member 8, said lower end being of cylindrical shape and said ring extends over the upper end of the cylinder 6, as shown in Figure 2. A beam 10 extends across the top of the cylinder 6 and carries at its center the anti-friction means 11 through which the shaft 11 passes, said anti-friction means preventing "whip" of the shaft. The lower end of the shaft is formed with a spherical part 7' which is seated in a cap-shaped part 15 at the upper end of a screw 16 which screw passes through the threaded hole at the bottom of a depending frame 17 having its upper end connected with the member 1. Thus by turning the screw 16 the shaft can be adjusted vertically so as to adjust the conical member 8 relative to the member 6. A pulley 18 is fastened to the lower part of the shaft so that the shaft can be driven from a suitable source of power by a belt. Blades 12 radiate from the conical member 8 and said blades gradually increase in width from the upper end of the member 8 to the lower end thereof and straight extensions 13 are connected with the lower ends of the blades 12 and are located in the annular space between the cylinder 6 and the cylindrical part of the housing. The blades 12 are provided with bent flanges 12' which are fastened to the member 8 by rivets or the like and as will be seen the lower ends of the blades 12 are formed of straight portions extending downwardly along the cylindrical part of the conical member and the extensions 13 depend from these straight portions of the blades. It will also be seen that these extensions 13 are spaced from the cylinder 6 and each extension 13 is of arcuate shape in cross section as shown more particularly in Figure 5, this shape of the extension causing the material to move toward the center of the extension and away from the outer edges thereof, thus facilitating the passage of the material through the device.

The material to be separated is introduced into the housing through the inlet 5 and such material will be engaged by the rotating conical member 8 and its blades 12 and the material will be directed by the conical member 8 into the annular space formed by the cylinder 6 and the cylindrical part of the housing where the material will be acted upon by the extensions 13 which will force the material through the holes 2 into the conduits 3.

In practice the material introduced into the device may not be evenly distributed through the area of the intake which would result in an uneven division. Thus the revolving conical member with its blade will evenly spread the material and cause it to pass into the conduits 3 in an even distribution and division of the material. As before stated these conduits 3 can lead to any desired point and where the material has considerable weight it can simply be placed in the inlet 5 to permit gravity to cause it to flow through the apparatus but in certain cases the material can be introduced into the inlet 5 by air pressure or the like. This latter operation is desirable when the apparatus is being used for the separation of cotton, jute and the like. When air pressure is used the extensions may be made in spiral shape as shown at 13' in Figure 7 so that the compressed air will act on these extensions and tend to rotate the blades and conical member and thus render it unnecessary to provide drive means for the shaft 7.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A device of the class described comprising a housing, a base for the housing having holes therein surrounded by the housing, a stationary member in the housing forming with the housing an annular space with which the holes are in communication, a conical member above the stationary member for directing material placed in the housing into the space, blades radiating from the conical member and having extensions extending into the annular space, a shaft passing through the base and through the stationary member and journaled in the base and in the stationary member with its upper end connected with the conical member and means for rotating the shaft to rotate the conical member.

2. A device of the class described comprising a housing including a lower cylindrical part, an intermediate conical portion and a small inlet-forming top part, a cylindrical stationary member in the cylindrical part of the housing spaced therefrom and forming therewith an annular space, a base member on which the housing and said cylindrical member are supported, said base member having holes therein in communication with the lower end of said annular space, a conduit leading from each hole, a shaft passing through the base and cylindrical member with its upper end located in the conical part of the housing, a conical member having its upper pointed end connected with the shaft for rotation therewith, blades radiating from the conical member and extensions connected with the lower ends of the blades and located in the annular space, said extensions being of arcuate shape in cross section.

3. A device of the class described comprising a housing including a lower cylindrical part, an intermediate conical portion and a small inlet-forming top part, a cylindrical stationary member in the cylindrical part of the housing spaced therefrom and forming therewith an annular space, a base member on which the housing and said cylindrical member are supported, said base member having holes therein in communication with the lower end of said annular space, a conduit leading from each hole, a shaft passing through the base and cylindrical member with its upper end located in the conical part of the housing, a conical member having its upper pointed end connected with the shaft for rotation therewith, blades radiating from the conical member and extensions connected with the lower ends of the blades and located in the annular space, said extensions being of spiral shape.

DANIEL J. COURTNEY.